CLOCK WITH VISIBLE AND AUDIBLE ALARM MEANS

Original Filed Aug. 28, 1945 2 Sheets-Sheet 1

INVENTOR.
Anthony J. Parissi
BY
ATTORNEY

CLOCK WITH VISIBLE AND AUDIBLE ALARM MEANS

Original Filed Aug. 28, 1945 2 Sheets-Sheet 2

INVENTOR.
Anthony J. Parissi
BY
ATTORNEY

Reissued Aug. 22, 1950 Re. 23,261

UNITED STATES PATENT OFFICE 23,261

CLOCK WITH VISIBLE AND AUDIBLE ALARM MEANS

Anthony J. Parissi, Cohoes, N. Y.

Original No. 2,444,748, dated July 6, 1948, Serial No. 613,070, August 28, 1945. Application for reissue March 5, 1949, Serial No. 80,805

12 Claims. (Cl. 58—19)

Matter enclosed in heavy brackets [ ] appears in the original patent but forms no part of this reissue specification; matter printed in italics indicates the additions made by reissue

My invention relates to alarm clocks and particularly but not exclusively to improvements in electric alarm clocks.

Ordinary alarm clocks are equipped with bells or buzzers which emit audible signals. Such clocks are of no value whatever to a person who is deaf and in many instances fail to awaken persons of normal hearing unless the alarm is very loud. In any event, the sudden awakening of a sleeper by a loud noise, such as the clamorous ringing of a bell, produces a distinct shock on the nervous system and, where other persons are sleeping in proximity to the alarm, they are also awakened.

The principal object of my invention is to provide an alarm clock which will first give a visible alarm signal comprising an electric light and, in the event that said light fails to function, will, after the lapse of a predetermined interval following the time when said light should have begun to function, give an audible signal. Another object is to provide such an alarm clock having means for effecting an intermittent flashing of the light alarm which many experiments have determined will invariably awaken a normal sleeper within an interval of from one to three minutes. A further object is to provide a simple device of this character which may be incorporated in any alarm clock but which is preferably associated with an electric alarm clock.

With these objects in view my invention includes the novel elements and the combinations and arrangements thereof described below and illustrated in the accompanying drawing in which—

Referring to the drawing—

Figure 2:
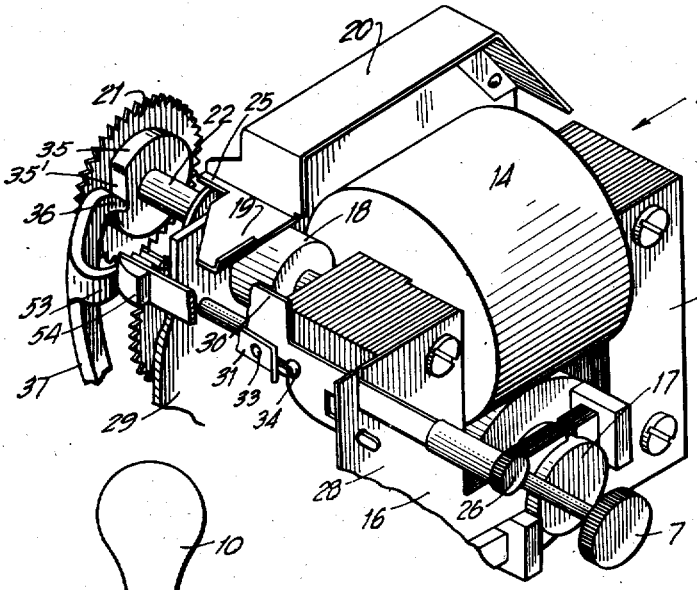
Fig. 2 is a fragmentary perspective view showing a portion of the side and rear of an electric clock mechanism and illustrating the controls for the visible and audible signals.
Figure 1:
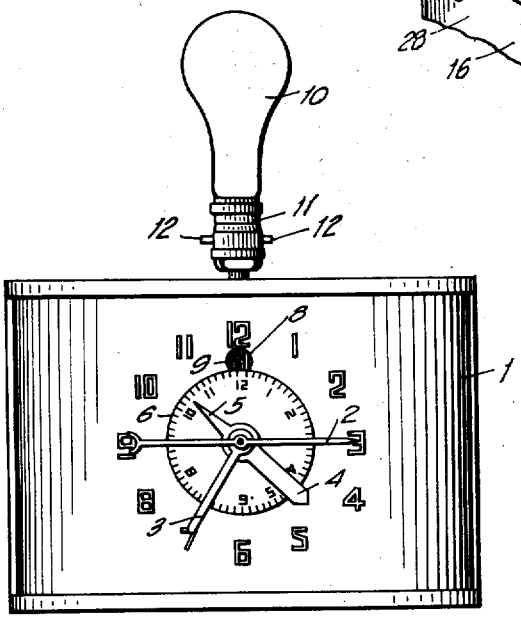
Fig. 1 is a front elevation view of an electric clock embodying my invention.

1 is the case of an electric clock having a sweep second hand 2, a minute hand 3 and an hour hand 4. The hour hand 4 carries a pointer 5 which indicates on the graduated disc 6 the time for which the alarm is set; it being understood that this disc may be turned independently of the clock hands by means of the alarm setting button 7 (see Fig. 2) which is understood to project through the back of the clock in the usual way. The clock motor is a synchronous motor and preferably of the self starting type so that, in the event of a power interruption, the clock will start as soon as the power comes on. A small circular opening 8 is provided in the face of the clock, and pivotally mounted behind this is a red disc 9 which becomes visible only upon an interruption of the power to indicate that the clock has been stopped and that the time indicated thereby is not the correct time. Mounted on top of the clock is the visible signalling device 10, here shown as an ordinary incandescent lamp bulb which is mounted in the socket 11 having the usual switch 12 for turning the light on or off so that it may be used as a reading lamp if desired. However, it is to be understood that the lamp may be placed anywhere and that the switch 12 need not be associated with the lamp socket. In fact, if the lamp is to be used solely as a signal or alarm, the switch 12 may be omitted.

Figure 3:
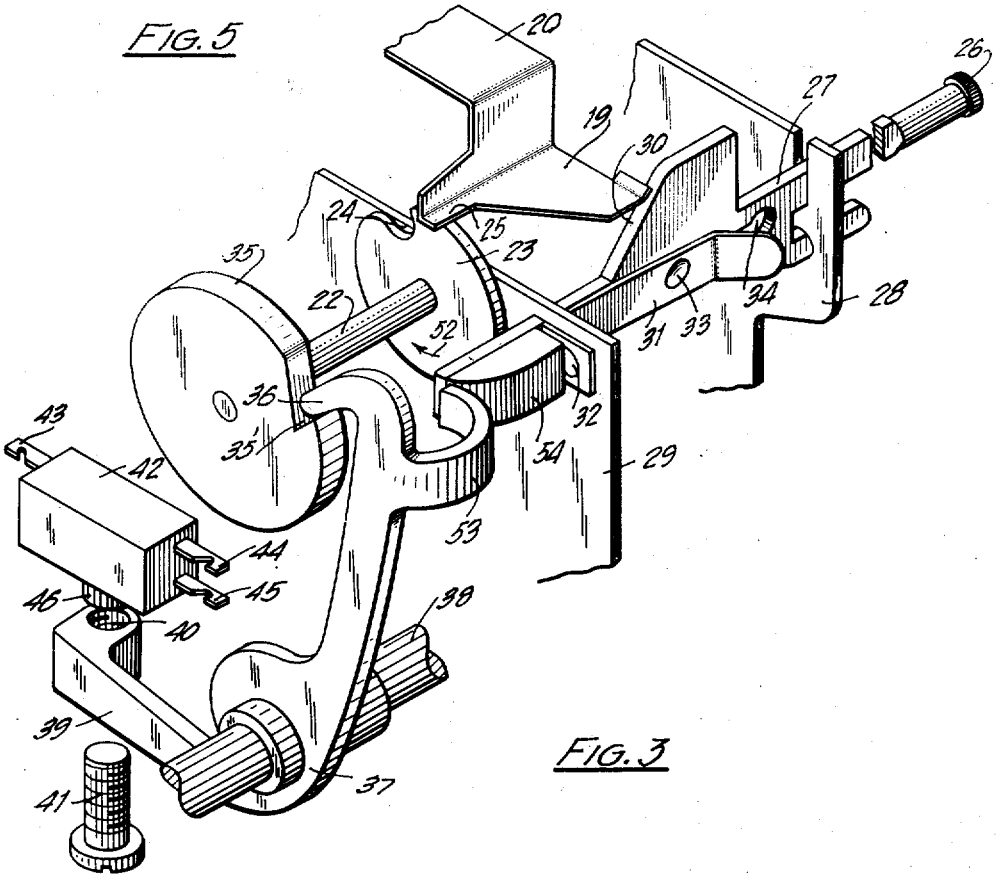
Fig. 3 is a fragmentary perspective view of the controls for the signals including a switch; certain parts which would obscure essential details of the control being omitted.

Referring to Figs. 2 and 3, 13 represents generally the clock motor which comprises the coil 14, the pole pieces 15 and 16 and an armature enclosed in the casing 17. One of the pole pieces 16 has an extension 18 which alternately attracts and releases the armature 19 of a vibrating element 20 to produce a buzzing sound. When the clock is in operation with the power on, a constant vibration of the element 20 would take place unless it were mechanically restrained and hence means, which will hereinafter be described, is provided, whereby vibration of the element 20 is prevented at all times when the alarm control is in the off position.

21 is the alarm gear which is driven by the clock motor and is to be understood as making one turn in 12 hours. Mounted upon the alarm gear shaft 22 is a cam 23 having a notch 24 therein (see Fig. 3). The cam 23 *cooperates with* [normally engages] the extension 25 of the armature portion 19 of the vibrating element 20, *as a follower* and prevents it from vibrating until it is released by the dropping of the extension 25 on the armature 19 into the notch 24 in the cam.

The button 26 which projects from the back of the clock is the off and on control for the alarm. Thus, in the position of the button 26 shown in Figs. 2 and 3 the alarm will be sounded when the proper time is indicated by the clock. In other words, the button 26 is shown in alarm-on position. The button 26 is connected to the lever 27 which is slidably mounted in the clock frame members 28 and 29 and carries a cam 30 which is adapted to pass under and engage the end of the armature 19 when the button 26 is pushed inwardly, or to the left as shown in Fig. 3 and thus to maintain the armature 19 in non-vibrating position. The flat spring member 31 which is secured to the frame member 29, as shown at 32, is provided with a spherical depression 33 therein which is designed to cooperate with the opening 34 in the lever 27 to form a stop motion for the lever when it is pressed inwardly.

So far, the clock mechanism which I have described is a standard mechanism forming part of almost all electric alarm clocks as now manufactured. To this mechanism I propose to add my visible alarm signal and so to incorporate it with the audible alarm signal given by the element 20 that my visible signal will first be given and then, after any predetermined interval to be fixed by the manufacturer of the clock, will be followed by the audible signal. To do this I fix a second cam 35 having a notch 35' therein to the shaft 22 of the alarm gear 21 as shown in Figs. 2 and 3. Cooperating with the cam 35 is a pawl *or follower* 36 which, as illustrated, is part of the bell crank 37 which is mounted to rotate freely on the shaft 38. The other arm 39 of the bell crank is provided with a threaded passage 40 adapted to receive the adjusting screw 41. 42 is an electric switch of the single pole, double-throw type having the terminals 43, 44 and 45. The switch is adapted to be actuated by the push button 46 which is spring biased by means of the compression spring 47, shown schematically in Fig. 4, to maintain the terminal 43 normally in electrical contact with the terminal 45. However, when the button 46 is pressed against the compression of spring 47 by means of the cooperation of the adjusting screw 41 therewith, the terminal 43 is held in electrical contact with the terminal 44.

Figure 4:
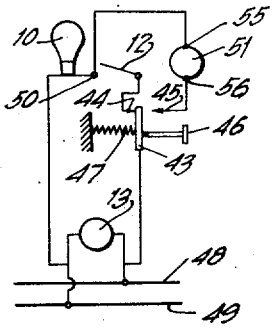
Fig. 4 is a diagram of the electric wiring.

Referring now to Fig. 4, 48 and 49 are main power lines to which the clock 13 may be connected by a plug and socket in the usual manner. Bearing in mind that the terminal 43 is normally held in contact with the terminal 44 by means of the coaction of the *follower* [pawl] bell crank with the button 46, the light 18 may be turned on or off by means of the switch 12. Thus it may be used as a reading lamp.

In operation, the cam 35, instead of the cam 23, is so correlated with the alarm setting disc 6 that if, for example, the 10th hour graduation on the disc is set to coincide with the pointer 5 on the hour hand, the *follower* [pawl] 36 will fall into the notch 35' when the hands on the face of the clock indicate 10 o'clock. It is to be understood that the spring which normally forces the button 46 downwardly, as viewed in Fig. 3, normally holds the *follower* [pawl] in frictional contact with the cylindrical surface of the cam 35 and the pressure with which the *follower* [pawl] 36 is held in contact with the cam surface may be adjusted by means of the adjusting screw 41. Thus, when the cam 35 has rotated to a point where the *follower* [pawl] 36 can move into the notch 35' it will be forced into this notch by the release of compression on the spring in switch 42 which forces the button 46 downwardly.

Now, referring more particularly to Fig. 4, when the *follower* [pawl] 36 enters the notch in the cam 35, the bell crank will allow the button 46 to move to the right, as viewed in Fig. 4, thus breaking the contact between terminals 43 and 44 and establishing contact between the terminal 43 and the terminal 45. If the lamp 18 were lighted at this time it would be momentarily extinguished by the breaking of its normal lighting circuit. However, the terminal 45 is simultaneously electrically connected to the terminal 50 of the lamp through the thermostatic element 51 which may be, and preferably is, a so called flasher button which will begin, in effect, alternately to make and break the electrical circuit in which it is installed within a few seconds thereafter. Thus, the lamp 18 is alternately lighted and extinguished. If, at the time the alarm goes off, the lamp is not lighted it will begin to flash within a few seconds after terminals 43 and 45 are brought into contact.

Figure 5:
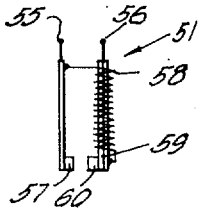
Fig. 5 is a more or less schematic view of a thermostat element for alternately making and breaking the circuit through the visible signal to produce a flashing thereof.

In Fig. 5 I have shown in a diagrammatic manner how the thermostatic element 51 operates. 55 and 56 are the terminals of the device. The terminal 55 is electrically connected to a fixed contact point 57 and is also connected to terminal 56 through the high resistance coil 58 which is wound about the bimetallic element *59* [39] carrying the contact point 60 adapted to cooperate with contact 57. When the points are separated current flowing through the resistance heating coil 58 heats the bimetallic element 59 causing it to flex or warp and bring contacts 57 and 60 together. When this occurs, terminals 55 and 56 are directly connected through a resistance of negligible magnitude, the high resistance coil 58 is shunted, and the bimetallic element 59 cools and assumes its original form, thus separating contacts 57 and 60. Current then flows only through the heating coil 58 and the cycle is repeated. It will be apparent that the circuit through the lamp and the thermostatic switch is never completely opened by the action of said switch because, when this circuit is otherwise closed by switch 42, current will always flow through the resistance heating coil 58. However, the practical effect of the operation of the thermostatic switch, as evidenced by the flashing of lamp 18, is the same as though the lamp circuit were alternately closed and opened, and I have referred throughout the specification and claims to the thermostatic switch as a circuit making and breaking means. The thermostatic switch does actually make and break the circuit which lights the lamp although another circuit of very high resistance is immediately established through the lamp filament when the lighting circuit is broken.

Many tests have indicated that the flashing of the light 18 will awaken the average sleeper within an interval of three minutes or less. However, in the event that the lamp has burned out or has been removed from the socket, the cam 23 which turns continuously in the direction of the arrow 52 will shortly release the audible alarm 20 which will continue to function until the extension 25 passes out of the notch 24 in cam 23. Obviously, the notches in the cams 23 and 35 may be disposed at any desired time interval apart so that the light signal may continue for any desired interval before the audible signal is released.

Unless some means were provided for preventing the *follower* [cam] 36 from dropping into the notch 35' in cam 35 when the alarm control is in the off-position, the flashing signal would be given every 12 hours; the time depending upon the setting of the alarm. To prevent this I provide the bell crank 37 with an arm 53 which cooperates with a cam 54 on the alarm control lever 27 when said arm is pushed inwardly. Thus, when the button 26 is pushed in, the cam 30 holds the vibrating armature 19 in inoperative position and the cam 54 cooperating with the arm 53 holds the *follower* [pawl] 36 in inoperative position.

From the foregoing it will be apparent that I have provided, by a rather simple modification of the ordinary electric alarm clock, an alarm clock giving both a visible and an audible signal and while, as illustrated, the invention is shown as incorporated in an electrical clock, it may be incorporated in any alarm clock.

In addition to its utility as an ordinary alarm clock the device may be used as a desk or reading lamp, and when so used it may be set to give a flashing signal at any desired time. It makes no difference whether the lamp 10 is lighted or out at the time the signal is given because, the light control switch 11 is automatically shunted and a new circuit established through the lamp.

The device, whether it be used as an alarm for awakening a sleeper, an appointment signal, or otherwise should prove a boon to persons who are nervous and detest noise of any kind.

*By the term "electric clock" as used in the claims, I mean to include only clocks in which the timing mechanism is actuated by a synchronous motor.*

While I have described my invention in its preferred embodiment it is to be understood that the words which I have used are words of description rather than of limitation and that changes within the purview of the appended claims may be made without departing from the true scope and spirit of my invention.

What I claim is:

[1. An alarm clock having an electric light mounted thereon, a switch for operating said light, circuit forming means adapted to connect said light through said switch to a source of power to form a normal lighting circuit, a shunt circuit in said clock around said switch and including said light and a thermostatic element adapted automatically to make and break said shunt circuit to produce a flashing of said light, and clock controlled means for breaking said normal lighting circuit and establishing said shunt circuit as a lighting circuit.]

[2. An alarm clock combination comprising a clock, releasable means for giving an audible alarm, an electric alarm circuit including a switch, a pair of automatic release mechanisms, both operated by said clock, one for releasing said audible alarm giving means and the other for closing said switch, common means for adjusting said release mechanisms for the purpose of determining the time when the audible alarm will sound and the time the switch will be closed automatically, means for at will preventing the sounding of the audible alarm when it would otherwise sound, and means for at will preventing the closing of the switch when it would otherwise close in response to automatic clock operation.]

[3. An alarm clock combination comprising a clock, releasable means for giving an audible alarm, an electric alarm circuit including a switch, two separate automatic release mechanisms, both operated by said clock, one for normally holding said releasable alarm giving means inoperative and releasing it at a predetermined time and the other for closing said switch, common means for adjusting said release mechanisms to determine the times when they will perform their automatic operations, manually operable means for at will preventing the automatic sounding of the audible alarm when it would otherwise sound and to stop its operation when sounding, and manually operable means for at will preventing the automatic closing of said switch when it would otherwise close and to open the switch when closed.]

[4. In an alarm clock, the combination with a clock mechanism, of an electric lamp, an electric circuit including said lamp, means for connecting said circuit to a source of power, means for automatically making and breaking said lamp circuit to effect a flashing of said lamp, clock actuated means for producing an audible alarm, and clock controlled mechanism for actuating said lamp circuit connecting means and putting said circuit making and breaking means and said audible alarm producing means into operation in sequence, in the order last named with an interval of substantial duration positively timed by the operation of said clock mechanism therebetween; whereby, in the event said lamp is defective said audible alarm will function in lieu thereof after the expiration of said interval.]

[5. In an alarm clock, the combination with a clock mechanism, of an electric lamp, an electric circuit including said lamp, means for connecting said circuit to a source of power, means for automatically making and breaking said lamp circuit to effect a flashing of said lamp, clock actuated means for producing an audible alarm, releasable means for actuating said lamp circuit connecting means and putting said circuit making and breaking means into operation, releasable means for putting said audible alarm producing means into operation, clock actuated means for first releasing said means for actuating said lamp circuit connecting means and putting said circuit making and breaking means into operation and, after the expiration of an interval of substantial duration positively timed by the operation of said clock mechanism, releasing said means for putting said alarm producing means into operation.]

[6. An electric alarm clock comprising clock mechanism, a vibrating element adapted to produce an audible alarm, an electric light, an electrical circuit including said light, means for connecting said clock mechanism and said circuit to a source of power, means for automatically making and breaking the circuit through said light to produce a flashing thereof, clock controlled means for putting said circuit making and breaking means into operation at a predetermined time and said vibrating element into operation following the lapse thereafter of an interval positively timed by the operation of said clock mechanism, and a single manually actuated means for stopping the operation of said vibrating element and said circuit breaking means.]

7. An electric alarm clock comprising a clock mechanism, a vibrating element adapted to produce an audible alarm, an electric light, a first electrical circuit including said light and a switch for turning said light on and off, means for connecting said clock mechanism and said circuit to a source of power, a second circuit by-passing said switch but including said light and means for automatically making and breaking said second circuit, means controlled by said clock mechanism for breaking said first circuit and connecting said second circuit to a source of power at a predetermined time, and clock controlled means for putting said vibrating element into operation following the lapse of an interval positively timed by the operation of said clock mechanism after the breaking of said first circuit.

[8. In an alarm clock, the combination with a casing, of a clock mechanism in said casing, electric circuit forming means including a socket adapted to connect an electric lamp in said circuit and means for automatically making and breaking said circuit, a switch controlled by said mechanism for connecting said circuit forming means to a source of power, means controlled by said mechanism for giving an audible alarm after the expiration of an interval positively timed by the operation of said clock mechanism following the actuation of said switch, and means for setting said mechanism to actuate said switch at a predetermined time.]

[9. In an alarm clock, the combination with an electric lamp, of a first electric circuit including said lamp, means for connecting said circuit to a source of power, a normally open second electric circuit including said lamp and a thermostatic switch for automatically making and breaking said second circuit to effect a flashing of said lamp, and means controlled by said clock for breaking said first circuit and closing said second circuit at a predetermined time.]

[10. In an alarm clock, the combination with a casing, of a clock mechanism in said casing, electric circuit forming means including a socket, adapted to connect an electric lamp in said circuit, and also a thermostatic switch for automatically making and breaking said circuit, a switch controlled by said clock mechanism for connecting said circuit forming means to a source of power, and means for setting said clock mechanism to actuate said clock controlled switch at a predetermined time.]

11. In an *electric* alarm clock, the combination with an electric clock mechanism, of releasable means, automatically operable when said mechanism is connected to a source of power, for giving a signal, a switch having terminals electrically connected to said source of power when said switch is closed and said clock mechanism is connected to said source of power, a first means controlled by said clock mechanism for closing said switch, a second means controlled by said clock mechanism for normally holding said releasable signal giving means inoperative but adapted to release said signal giving means at a predetermined time; the operation of said two clock controlled means being separated by an interval of predetermined duration positively timed by the operation of said clock mechanism; *a single manually operable means for preventing the release of said releasable signal giving means and also the closing of said switch when said signal giving means would otherwise be released and said switch would otherwise be closed in response to the normal operation of said clock mechanism* and means for setting said clock controlled means to operate at predetermined times; whereby, a second, electrically controlled, signal giving means may be connected to the terminals of said switch and controlled thereby in positively timed relation to the operation of said releasable signal giving means.

[12. The structure set forth in claim 11 together with manually actuated means for holding said releasable signal giving means inoperative when it would otherwise be released by said second clock controlled means.]

[13. An electric alarm clock comprising a clock mechanism, a vibrating element adapted to sound an audible alarm and automatically operable when said clock mechanism is in operation, an electric light, an electric circuit including said light and a releasable switch for closing said circuit to light said light when said clock mechanism is in operation, means driven by said clock mechanism and normally cooperating with said vibrating element to prevent vibration thereof but adapted to release said element at a predetermined time to sound said audible alarm, means, including means driven by said clock mechanism, normally maintaining said switch open but adapted to release said switch to close said circuit; said switch releasing means and said vibrating element releasing means operating in sequence with an interval of predetermined duration positively timed by said clock mechanism therebetween; and manually operable means for setting said releasing means to operate at predetermined times.]

[14. In an alarm clock, the combination with a casing, of an electric clock mechanism therein, means adapted to connect said mechanism to a source of power, a vibrating element normally operable when said clock mechanism is so connected to sound an audible signal, a normally open switch in said casing having terminals which are connected to said source of power when said mechanism is so connected and said switch is closed, means controlled by said clock mechanism for closing said switch, means controlled by said clock mechanism for normally holding said vibrating element inoperative and releasing the same upon the expiration of a predetermined interval of substantial duration positively timed by the operation of said clock mechanism following the closing of said switch, and means for setting said clock controlled, switch closing means to operate at a predetermined time; whereby a second, electrically operated, signal giving means may be connected to the terminals of said switch and set to operate at a predetermined time prior to the operation of said audible, signal sounding means.]

[15. An alarm clock, comprising the combination with a casing, of an electric clock mechanism therein, means adapted to connect said mechanism to a source of power, a vibrating element normally operable when said clock mechanism is so connected to sound an audible signal, a first, electric circuit forming means including a socket adapted to connect an electrically operated signal giving means exterior of said casing in said circuit and a manually operable switch on said casing for connecting said socket to and disconnecting it from said source of power when said clock mechanism is connected to said source of power, a second, electric circuit forming means including said socket and a second switch for connecting said socket to said source of power, means controlled by said clock mechanism for effecting a closing of said second switch, means controlled by said clock mechanism for holding said vibrating element inoperative and releasing it upon the expiration of an interval positively timed by the operation of said clock mechanism following the closing of said second switch, and means for setting said clock controlled means for closing said second switch to operate at a predetermined time.]

16. An alarm clock comprising the combination with a casing, of an electric clock mechanism therein, means adapted to connect said mechanism to a source of power, a vibrating element normally operable when said clock mechanism is so connected to sound an audible signal, a first, electric circuit forming means including a socket adapted to connect an electric light exterior of said casing in said circuit, and a manually operable switch on said casing for normally controlling the operation of said light by connecting said socket to and disconnecting it from said source of power when said clock mechanism is connected to said source of power; a second electric circuit forming means including said socket, a second switch for connecting said socket to said source of power, and a thermostatic element adapted automatically to make and break said second circuit when said second switch is closed; means controlled by said clock mechanism for closing said second switch, means controlled by said clock mechanism for holding said vibrating element inoperative and releasing it upon the expiration of an interval positively timed by the operation of said clock mechanism following the closing of said second switch, and means for setting said clock controlled means for closing said second switch to operate at a predetermined time.

[17. In an alarm clock, the combination with a casing, of a clock mechanism therein, a socket on said casing adapted to have an electric light electrically connected thereto, a first, circuit-forming means, including a manually-actuated switch for connecting said socket in said circuit and disconnecting it therefrom, means for electrically connecting said first circuit to a source of power; means forming a second circuit including said socket, means for automatically making and breaking said second circuit, when energized, and a second switch for connecting said second circuit to said source of power independently of the position of said manually actuated switch; means controlled by said clock mechanism for actuating said second switch, and means for setting said clock-mechanism-controlled means to actuate said second switch at a predetermined time.]

[18. An alarm clock combination comprising a clock, an audible alarm, an electric alarm circuit including a switch, two separate automatic release means operated by said clock; one cooperating directly with said audible alarm and normally holding it inoperative but adapted to release said audible alarm to permit it to sound, and the other for closing said switch; and means for adjusting the time of day at which said automatic operations will be performed.]

19. An alarm clock combination comprising a clock, a casing therefor, a pair of rotary disk-shaped cams fixedly mounted on a common shaft in said casing and driven by said clock at the rate of one turn in twelve hours, a pair of cam followers bearing against said cams, means operated by said cam followers for controlling the automatic operations of separate alarms, and means manually operable exterior of said casing for adjusting the rotary position of said cam shaft relative to the clock for determining the time of day the automatic alarm operations will be performed.

20. An alarm clock comprising clock mechanism, means for giving an audible alarm, means for giving a visible alarm, a shaft driven by said mechanism at a rate of one turn in twelve hours, a first cam on said shaft, means controlling the operation of said visible alarm cooperating with said first cam and normally maintaining said visible alarm inoperative, a second cam on said shaft cooperating with said audible alarm giving means and normally maintaining said audible alarm inoperative; said cams being provided with means adapted to cooperate with said audible alarm giving means and said visible alarm controlling means, respectively, at predetermined times to put said visible alarm first into operation and, after the expiration of a predetermined interval of substantial duration positively timed by the operation of said clock mechanism, to release said audible alarm for operation.

*21. A unitary electric alarm clock comprising the combination with a casing having an electric clock mechanism therein, of means for connecting said mechanism to a source of power; means in said casing forming an electric circuit including a first switch for connecting said circuit to said source of power when said clock mechanism is so connected and a thermostatic switch for automatically opening and closing said circuit; a socket on said casing and forming a part of said circuit for connecting an electrically operated signaling device exterior of said casing to said source of power when said mechanism is so connected and said switch is closed; releasable means wholly within said casing for giving an audible signal and normally operable at all times, unless restrained, when said clock mechanism is in operation; means actuated by said clock mechanism normally restraining the operation of said audible signal means and normally maintaining said first switch open; said last mentioned means including means for effecting a closing of said switch, and, after a predetermined interval of time of substantial duration positively timed by said clock mechanism following the closing of said switch, for releasing said audible signal-giving means; and means for setting said mechanism to effect a closing of said first switch at a predetermined time.*

*22. A unitary electric alarm clock comprising the combination with a casing having an electric clock mechanism therein, of means for connecting said mechanism to a source of power; means in said casing forming an electric circuit including a first switch for connecting said circuit to said source of power when said clock mechanism is so connected and a thermostatic switch for automatically opening and closing said circuit; a socket on said casing and forming a part of said circuit for connecting an electrically operated signaling device exterior of said casing to said source of power when said mechanism is so connected and said switch is closed; releasable means wholly within said casing for giving an audible signal and normally operable at all times, unless restrained, when said clock mechanism is in operation; means actuated by said clock mechanism normally restraining the operation of said audible signal means and normally maintaining said first switch open; said last mentioned means including means for effecting a closing of said switch, and, after a predetermined interval of time of substantial duration positively timed by said clock mechanism following the closing of said switch, for releasing said audible signal-giving means; means for setting said mechanism to effect a closing of said first switch at a predetermined time; and manually operable means for preventing the closing of said first switch when it would otherwise close in response to the normal operation of said mechanism.*

*23. A unitary electric alarm clock comprising a casing, having an electric clock mechanism therein; means for connecting said mechanism to a source of power; a vibrating element in said casing for producing an audible signal and normally operable, unless restrained, at all times when said mechanism is connected to a source of power; means in said casing forming an electric circuit including a normally open switch for connecting said circuit to said source of power when said clock mechanism is connected to said source, a socket on said casing, and a thermostatic switch for intermittently breaking said circuit when closed by said normally open switch;*

*means in said casing controlled by said clock mechanism for effecting a closing of said normally open switch at a predetermined time; means in said casing controlled by said clock mechanism and normally restraining said vibrating element for releasing said element following the lapse of a predetermined interval positively timed by said clock mechanism following the closing of said switch; and manually operable means for setting the time when said switch will be closed; whereby an electric lamp may be connected in said circuit through said socket to give an intermittently flashing signal when said switch is closed.*

*24. In an alarm clock, the combination with a casing, of an electric clock mechanism in said casing, electric circuit forming means in said casing, including a socket on said casing adapted to connect an electric lamp in said circuit and means in said casing repeatedly making and breaking said circuit to effect a repeated lighting and extinguishing of said lamp when connected in said circuit, a switch controlled by said mechanism for connecting said circuit forming means to a source of power, manually operable means accessible exterior of said casing for preventing the closing of said switch when it would otherwise close in response to the normal operation of said mechanism, means controlled by said mechanism for giving an audible alarm after the expiration of an interval positively timed by the operation of said clock mechanism following the actuation of said switch, and means for setting said mechanism to actuate said switch at a predetermined time.*

*25. An electric alarm clock comprising in combination an electric clock mechanism; means for connecting said mechanism to a source of power; a releasable vibrating element normally operable, unless restrained, to sound an audible signal at all times when said mechanism is connected to said source of power; means forming an electric circuit adapted to have a second, electrically controlled, signal-giving means connected therein, and including a normally open switch for connecting said circuit to said source of power when said clock mechanism is so connected; two cams driven by said clock and making one turn in twelve hours; one of said cams cooperating with said vibrating element and normally restraining the vibration thereof but provided with means adapted to effect a release of said vibrating element; a follower cooperating with the other cam for effecting a closing of said switch; manually operable means for preventing the closing of said switch when it would otherwise close in response to the normal operation of said clock mechanism; and manually operable means for adjusting the time of day at which said switch will be closed and said vibrating element released.*

*26. A unitary electric clock comprising the combination with a casing having an electric clock mechanism therein; of means for connecting said mechanism to a source of power; a socket on said casing; circuit-forming means in said casing including said socket and a manually operable switch on said casing for connecting said socket to and disconnecting it from said source of power, when said clock mechanism is connected to said source of power; whereby, an electric lamp may be electrically connected to said socket and said circuit may be utilized as a normal lighting circuit; a second circuit-forming means in said casing, including said socket, a*

*normally open second switch for connecting said second circuit-forming means to said source of power when said second switch is closed and said mechanism is so connected, and a thermostatic switch for automatically making and breaking said second circuit when closed by said second switch; whereby an electric lamp when electrically connected to said socket may be caused to flash intermittently when said second circuit is closed by said second switch; a vibrating element in said casing normally operable, unless restrained, at all times when said clock mechanism is connected to said source of power to give an audible alarm; a first means controlled by said clock mechanism for effecting a closing of said second switch; a second means controlled by said clock mechanism for normally restraining said vibrating element and for releasing said vibrating element after the expiration of an interval positively timed by said mechanism following the closing of said second switch; and means for setting said first means to effect a closing of said second switch at a predetermined time.*

*27. An electric alarm clock comprising an electric clock mechanism, a vibrating element for sounding an audible alarm and automatically operable at all times when said clock mechanism is in operation; an electric light, an electric circuit including said light and a releasable switch for closing said circuit to light said light when said clock mechanism is in operation, means driven by said clock mechanism and normally cooperating with said vibrating element to prevent vibration thereof but adapted to release said element at a predetermined time to sound said audible alarm, means, including means driven by said clock mechanism, normally maintaining said switch open but adapted to release said switch to close said circuit; said switch releasing means and said vibrating element releasing means operating in sequence with an interval of predetermined duration positively timed by said clock mechanism therebetween; means for alternately making and breaking said circuit to effect a repeated flashing of said light and manually operable means for setting said releasing means to operate at predetermined times.*

ANTHONY J. PARISSI.

REFERENCES CITED

The following references are of record in the file of this patent or the original patent:

UNITED STATES PATENTS

| Number | Name | Date |
|---|---|---|
| 1,057,668 | Porter | Apr. 1, 1913 |
| 1,542,275 | Rodrigues | June 16, 1925 |
| 1,648,748 | Traub | Nov. 8, 1927 |
| 1,651,408 | Peacock | Dec. 6, 1927 |
| 1,672,791 | Thimblethorpe | June 5, 1928 |
| 1,730,276 | Kollman | Oct. 1, 1929 |
| 1,801,129 | Warren | Apr. 14, 1931 |
| 1,943,598 | Gourley | Jan. 16, 1934 |
| 2,026,070 | Sholden | Dec. 31, 1935 |
| 2,039,194 | Simon | Apr. 28, 1936 |
| 2,238,756 | Steeneck | Apr. 15, 1941 |
| 2,239,160 | Newman | Apr. 22, 1941 |
| 2,421,986 | Bohman | June 10, 1947 |

FOREIGN PATENTS

| Number | Country | Date |
|---|---|---|
| 8,258 | Netherlands | Feb. 15, 1923 |
| 699,666 | Germany | Dec. 4, 1940 |